United States Patent
Yamanouchi

[11] Patent Number: 5,144,490
[45] Date of Patent: Sep. 1, 1992

[54] ZOOM LENS

[75] Inventor: Haruhiko Yamanouchi, Kanagawa, Japan

[73] Assignee: Canon Kabushiki Kaisha, Tokyo, Japan

[21] Appl. No.: 603,539

[22] Filed: Oct. 25, 1990

[30] Foreign Application Priority Data

Oct. 30, 1989 [JP] Japan .................. 1-284594

[51] Int. Cl.$^5$ ............................................. G02B 15/00
[52] U.S. Cl. .................................... 359/694; 359/700; 359/701
[58] Field of Search ............... 359/694, 695, 699, 700, 359/701; 354/195.12

[56] References Cited

U.S. PATENT DOCUMENTS

| 4,534,625 | 8/1985 | Ohnuki | 359/701 |
| 4,848,884 | 7/1989 | Enomoto | 359/700 |
| 4,890,132 | 12/1989 | Hama | 359/694 |
| 4,925,282 | 5/1990 | Kanno et al. | 359/694 |

Primary Examiner—Paul M. Dzierzynski
Assistant Examiner—Hung-Xuan Dang
Attorney, Agent, or Firm—Robin, Blecker, Daley & Driscoll

[57] ABSTRACT

A zoom lens of the kind varying the focusing movement degree of a focusing-and-zooming lens according to the change of focal length caused by a power varying operation comprises a zooming cam member which rotates around an optical axis in response to zooming; a zoom cam formed in the zooming cam member; a first cam follower which engages the zoom cam; a zooming lens group which is movable in association with the movement of the first cam follower; a focusing cam member; a focus cam formed in the focusing cam member; a second cam follower which engages the focus cam; the focusing-and-zooming lens which is movable in association with the movement of the second cam follower; a focusing rotation member which rotates the second cam follower in response to a focusing action; and a moving mechanism which is arranged to vary the position of the focus cam by moving the focusing cam member in the optical axis direction in response to the rotation of the zooming cam member, in such a manner that a range of engagement of the second cam follower with the focus cam in the focusing action varies and the position of the second cam follower in the optical axis direction varies.

26 Claims, 11 Drawing Sheets

FIG.2 (TELEPHOTO END)

ARRANGEMENT IN THE CASE OF $Q_{max} = -1.5$

ARRANGEMENT IN THE CASE OF $Q_{max} = +0.86633$

ZOOM LENS

BACKGROUND OF THE INVENTION

1. Field of the Invention

This invention relates to a zoom lens of the optical type called an inner-focus or a rear-focus type.

2. Description of the Related Art

During recent years, various focus adjusting methods of shifting a lens group other than a front lens group have been contrived for the purpose of increasing the efficiency and magnification of the zoom lens.

Meanwhile, the zoom lenses have become automatically focusable in general. Demands have increased very much for reduction in weight of a focusing lens and for the zoom lens of the inner-focus or rear-focus type having its movable part arranged to be untouchable directly from the outside.

The known zoom lenses of this kind include:

(a) Zoom lenses of the type having the locus of zooming movement of the focusing lens group arranged to serve also as a part of the focusing movement of the focusing lens group, as disclosed, for example, in U.S. Pat. No. 4,534,625; Japanese Laid-Open Patent Application No. SHO 63-304217 (corresponding U.S. Pat. unknown); Japanese Laid-Open Patent Application No. SHO 64-35515 (corresponding U.S. Pat. unknown); and Japanese Laid-Open Patent Application No. SHO 64-35516 (corresponding U.S. patent unknown).

(b) Zoom lenses of the type having the focusing cam locus arranged to be formed separately from the zooming cam locus, as disclosed in Japanese Laid-Open Patent Application No. SHO 63-49715 (U.S. Pat. unknown).

(c) Zoom lenses which are provided with no cam that rotates in a fixed position, as disclosed in Japanese Laid-Open Patent Application No. SHO 63-314511 (U.S. Pat. unknown).

However, these prior art zoom lenses have presented the following problems:

The zoom lenses of the type of Para. (a) above are arranged to have the zooming movement of the focusing lens group to serve also as a movement to be made in focusing. The degree and direction of focusing rotation in relation to the angle of zooming rotation are thus determined in the designing stage of the lens. Therefore, the degree of latitude allowable for them is limited.

In the case of the zoom lenses of the type of Para. (b), a manner in which a zooming cam ring and a focusing cam ring are interconnected in the direction of rotation differs from a manner in which they are interconnected in the direction of the optical axis. Hence, they tend to be affected by the precision of parts and their fitting play.

The zoom lenses of Para. (c) are arranged to have a zooming cam shift its position in zooming back and forth non-linearly in the direction of the optical axis. It is, therefore, difficult. to keep a sufficient degree of precision for a lens group which is arranged to move in zooming. This also necessitates some protective measures against impact if a first lens group is arranged to be the lens group that moves in zooming. Therefore, efforts to reduce the size of the lens has been restricted.

SUMMARY OF THE INVENTION

It is a general object of this invention to provide a zoom lens which permits the degree of angle of focusing rotation and the direction thereof to be selectable as desired in relation to the angle of zooming rotation, and yet they are not easily affected by the degree of precision of parts and their fitting play.

The above and further objects and features of the invention will become apparent from the following detailed description of embodiments thereof taken in connection with the accompanying drawings.

DETAILED DESCRIPTION OF THE PREFERRED EMBODIMENTS

Figure 1:
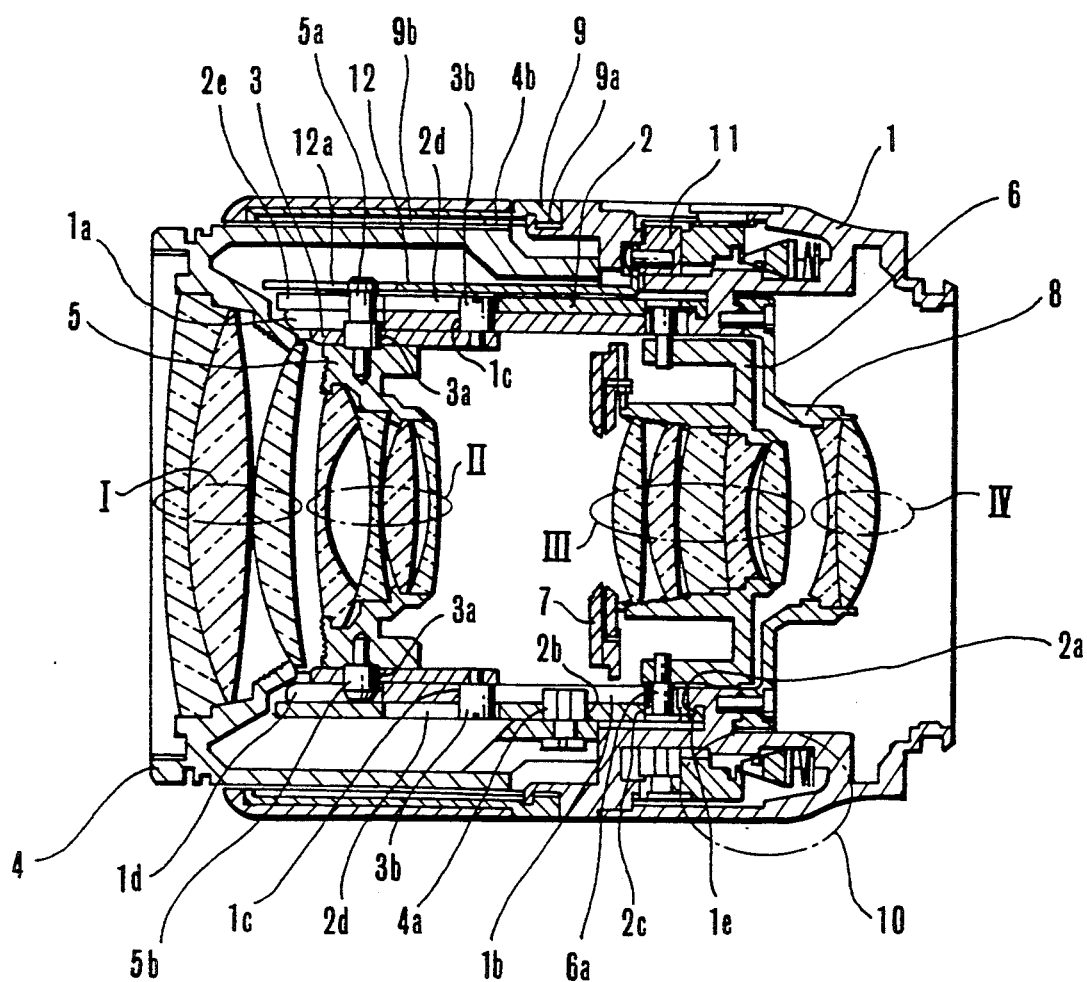
FIG. 1 is a sectional view of a zoom lens arranged as a first embodiment of this invention, the lens being shown as in a wide-angle position.
Figure 2:
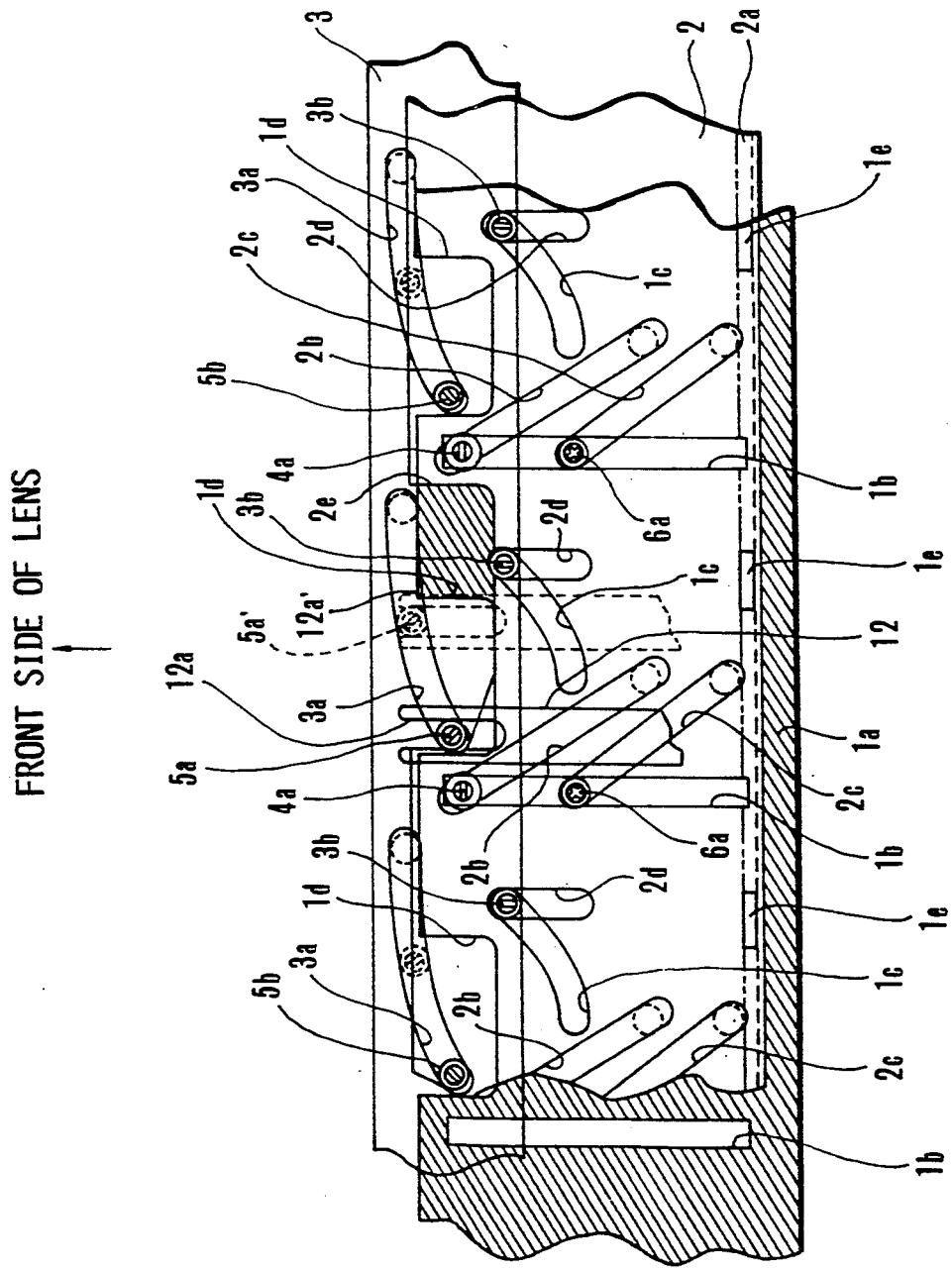
FIG. 2 is a development view showing the zoom lens of the first embodiment as in a telephoto end position.
Figure 3:
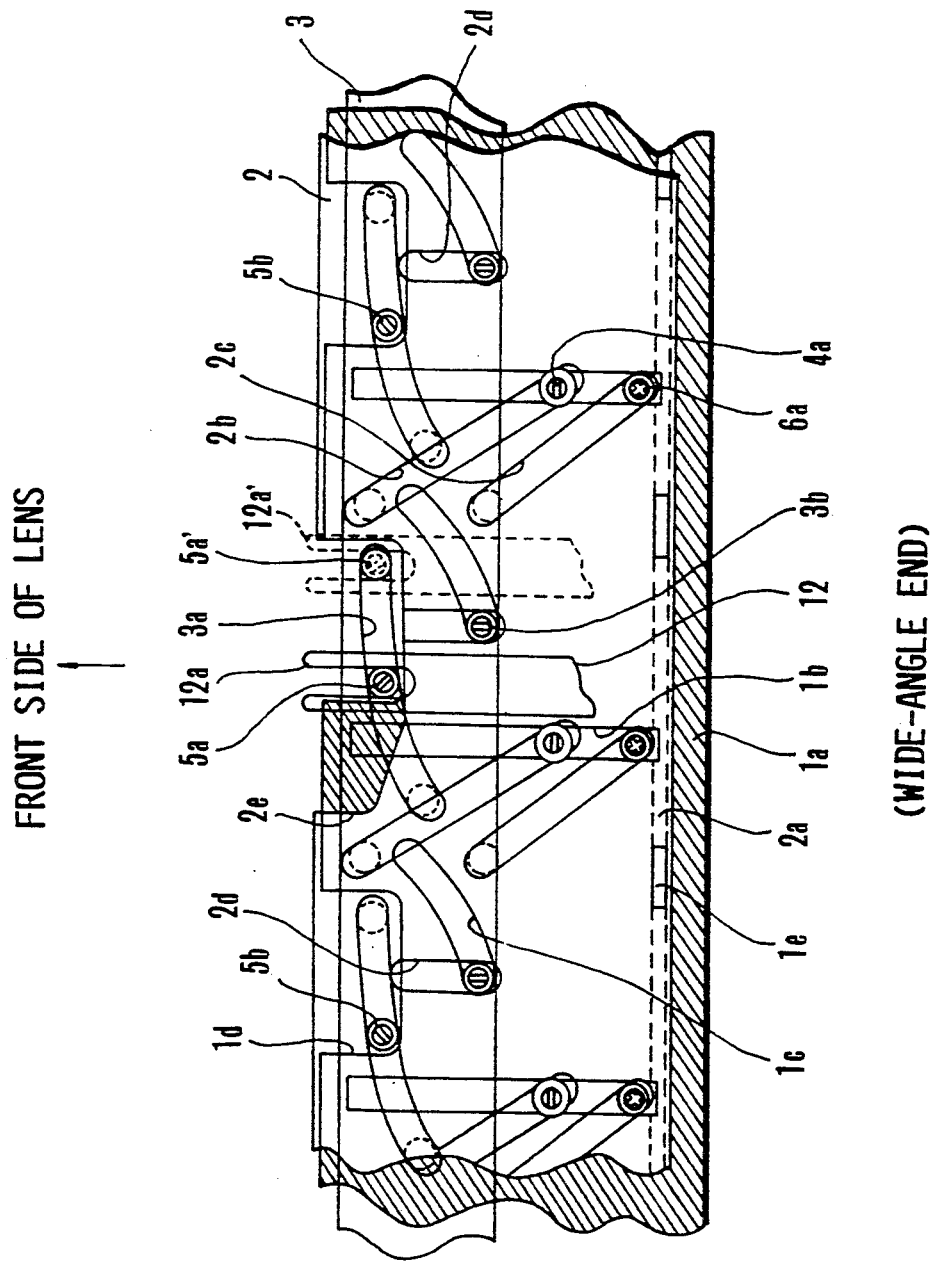
FIG. 3 is a development view showing the same zoom lens as in a wide-angle end position.
Figure 4:
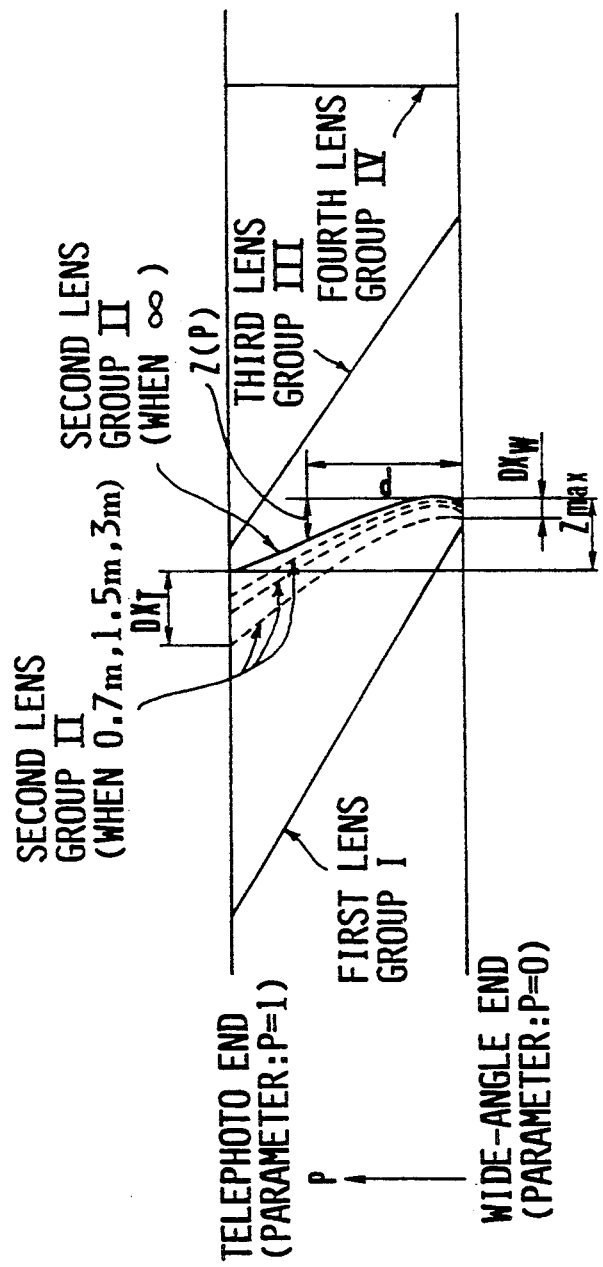
FIG. 4 is a diagram showing the movement of each of lens groups included in the zoom lens of the first embodiment.
Figure 5:
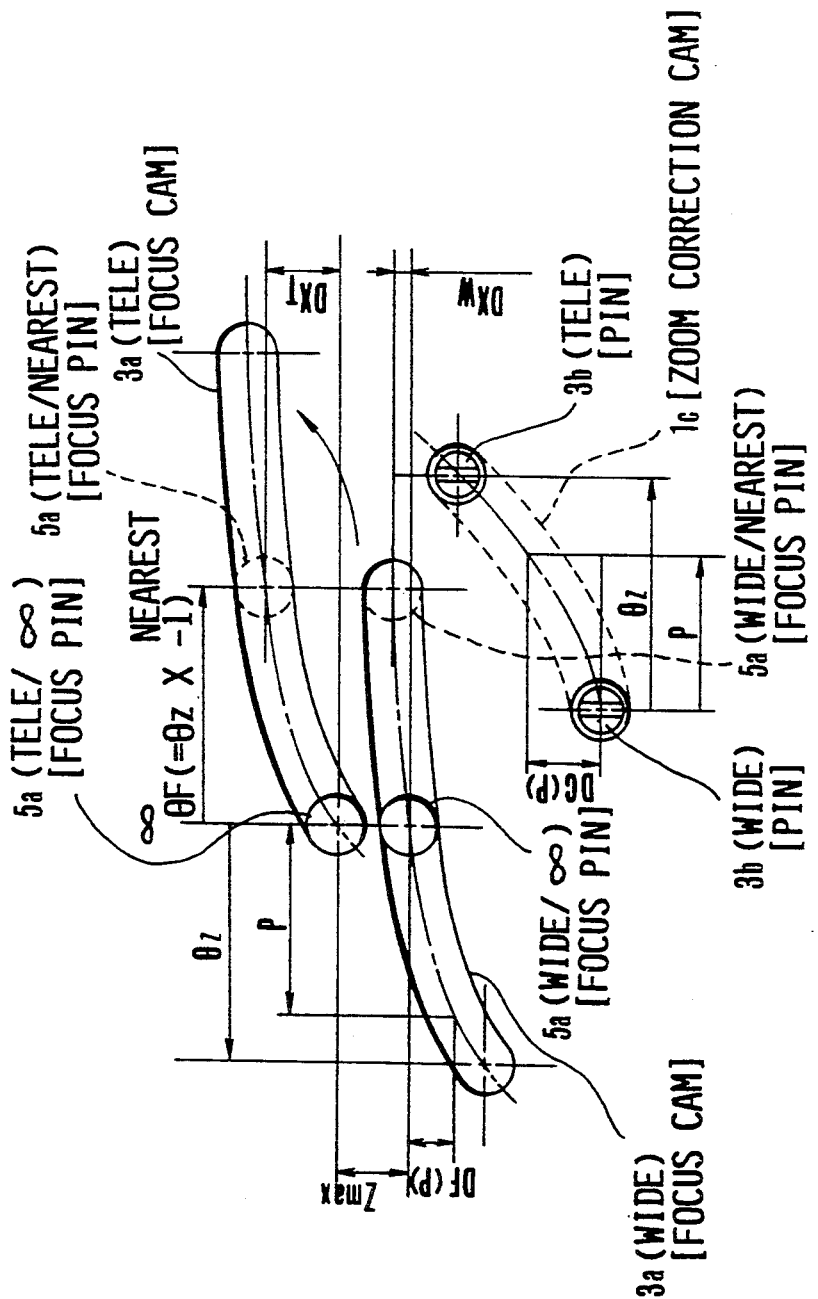
FIG. 5 is a detailed view showing the focusing arrangement of the first embodiment of the invention.

FIGS. 1 to 5 show a zoom lens arranged according to this invention as a first embodiment thereof. FIG. 1 is a sectional view of the lens and FIGS. 2 and 3 are development views. FIG. 2 shows the lens as in a telephoto end position and FIG. 3 as in a wide-angle end position. FIG. 4 is a diagram showing the zooming movement of the lens. FIG. 5 is a detailed view showing the focusing arrangement of the lens.

Referring to FIGS. 1 to 3, the zoom lens consists of a first lens group I; a second lens group II; a third lens group III and a fourth lens group IV. A tubular stationary member 1 has a guide part 1a. The guide part 1a includes three vertical slots 1b, three zoom correction cams 1c, three cutout parts 1d and three projections 1e. A zooming cam ring 2 is rotatably carried by the periphery of the guide part 1a and has a circumferential slot 2a arranged in its rear inner circumferential wall part to fittingly engage the projections 1e of the above-stated stationary member 1. The zooming cam ring 2 is thus carried in a fixed position to be rotatable around an optical axis. The zooming cam ring 2 is provided further with three cam slots 2b for three cam slots 2c for the third lens group, three straight slots 2d and a cutout 2e.

A focusing cam ring 3 is rotatably carried by the inner circumferential wall of the guide part 1a and is provided with three focusing cams 3a and three pins 3b. The pins 3b are arranged to engage, at the same time, the zoom correction cams 1c provided in the stationary member 1 and the straight slots 2d provided in the zooming cam ring 2.

A first lens group carrying tube 4 carries the first lens group I. The tube 4 has its inner circumferential side fittingly engage the periphery of the zooming cam ring 2 and is provided with three straight moving rollers 4a which are arranged to move from their fitting engagement parts straight toward the optical axis. Further, the straight moving rollers 4a engage, at the same time, the vertical slots 1b provided in the above-stated guide part 1a and the first lens group moving cam slots 2b provided in the above-stated zooming cam ring 2. Further, zoom rollers 4b are arranged on the periphery of the first lens group carrying tube 4.

A second lens group carrying tube 5 carries the above-stated second lens group II. The tube 5 is arranged to have its outer circumferential side fittingly engage the inner circumferential side of the above-stated focusing cam ring 3 and is provided with one focusing pin 5a and two pins 5b which are located in three equally spaced positions. The focusing pin 5a and the pins 5b engage the focusing cams 3a of the focusing cam ring 3 and thus have their positions restricted in the direction of the optical axis.

A third lens group carrying tube 6 carries the third lens group III. The peripheral part of the tube 6 fittingly engages the inner circumferential side of the guide part 1a of the stationary member 1. Three rollers 6a for the third lens group are provided on the peripheral part of the tube 6. The rollers 6a simultaneously engage the vertical slots 1b provided in the guide part 1a and the cam slots 2c which are provided in the above-stated zooming cam ring 2 for the third lens group.

A known electromagnetic diaphragm unit 7 is also carried by the third lens group carrying tube 6. A fourth lens group carrying tube 8 carries the fourth lens group IV and is secured to the stationary member 1 with screws.

A zoom operation ring 9 is rotatably carried at an abutment portion 9a by the above-stated stationary member 1. The ring 9 is provided with a lead cam groove 9b on its inner side. The lead cam groove 9b engages the zoom rollers 4b provided on the peripheral part of the first lens group carrying tube 4. An ultrasonic motor (vibratory motor) 10 is arranged to serve as a focusing drive source. The rotation force of the motor 10 is obtained through the rotation of an output member 11. A focus key 12 is secured to the output member 11 with a screw and is provided with a vertical groove 12a which is formed in the fore end part of the key 12. The groove 12a engages the focus pin 5a which is disposed on the peripheral part of the above-stated second lens group carrying tube 5. The focus pin 5a is thus restrained from rotating.

Referring to FIG. 4, the first lens group I is arranged to be linearly drawn out from a wide-angle end position toward a telephoto end position. The second lens group II is arranged to serve also as a focusing lens group. Therefore, when the focus is for an infinite distance, the initial position of the second lens group II is non-linearly shifted by a zooming action. Assuming that the zooming movement of the second lens group to be made in this instance is indicated as Z(p) in reference to the wide-angle end position (the value Z is on the assumption that the traveling direction of light is positive) and a zoom parameter as P (the value of P is "0" at the wide-angle end and "1" at the telephoto end), the movement can be expressed as follows:

$$Z(p) = 1.93193 \times P - 13.62876 \times P^2 + 1.13274 \times \quad (1)$$

$$P^3 + 19.88631 \times P^4 - 25.65480 \times P^5 + 11.40858 \times P^6$$

Further, with a degree to which the second lens group II is drawn out from the above-stated point Z by a focusing action is assumed to be indicated as DX(p), it can be expressed as follows:

In a case wherein the shooting distance is 3 m:

$$DX_{(p)}^{3m} = -0.2702 - 0.2363692 \times P - 2.7270722 \times P^2 + \quad (2)$$

$$12.0794000 \times P^3 - 27.4236170 \times P^4 + 28.2049157 \times P^5 -$$

$$11.3491573 \times P^6$$

In a case wherein the shooting distance is 1.5 m:

$$DX_{(p)}^{1.5m} = -0.549 - 0.6173387 \times P - 3.1734942 \times P^2 + \quad (3)$$

$$13.1939902 \times P^3 - 30.3540311 \times P^4 + 31.2372079 \times P^5 -$$

$$12.7014341 \times P^6$$

In a case wherein the shooting distance is 0.7 m $$DX_{(p)}^{0.7m} = -1.2253 - 1.4820686 \times P - 3.5679468 \times P^2 + \quad (4)$$

$$13.3637934 \times P^3 - 31.1590923 \times P^4 + 31.9703062 \times P^5 -$$

$$13.0506919 \times P^6$$

The third lens group III is linearly drawn out. The fourth lens group IV is stationary. FIG. 5 shows in detail the arrangement of the focusing cam ring 3 and the parts disposed around it. In the drawing, the zoom correction cam 1c which is provided in the guide part 1a of the stationary member 1 is shown in the middle of these parts. The drawing shows the focus cam 3a as in its wide-angle position and its telephoto position as obtained by the focusing cam ring 3 at the same time. The position of the focus pin 5a is also shown as obtained in shooting at the infinite distance and at the nearest distance of 0.7 m under these conditions.

In FIGS. 4 and 5, a reference symbol Zmax denotes the degree to which the second lens group II moves over a distance from the wide-angle end position to the telephoto end position in shooting at the infinite distance. A symbol $DX_W$ denotes the drawn-out degree of the DX obtained at the wide-angle end when the shooting distance changes from the telephoto end distance to the nearest end distance of 0.7 m. A symbol $DX_T$ denotes the drawn-out degree obtained at the telephoto end when the shooting distance likewise changes. Next, a symbol $\theta Z$ denotes the zooming rotation angle of the above-stated focusing cam ring 3. In the case of this embodiment, the zooming rotation angle is set at 40 degrees. A symbol $\theta F$ denotes the rotation angle of the focus pin 5a. In the case of this embodiment, the nearest-distance direction is reverse to the direction of the angle $\theta Z$ on the focusing cam ring 3 with reference to the infinite distance position. The value of focus pin rotating angle $\theta F$ is set at a value which is minus one time as much as the value $\theta Z$, i.e., $-40$ degree, at the nearest distance of 0.7 m.

Further, the focus cam 3a which is provided on the focusing cam ring 3 is formed in such a shape that: Each operating point on the focus cam 3a has the infinite distance position as a datum point at the wide-angle end.

Assuming that the axis of abscissa as viewed in the drawing indicates the above-stated zoom parameter P; the telephoto end is located in the pulse (positive) direction; the axis of ordinate obtained, when using the zoom parameter P, from the infinite distance position at the wide-angle end toward the optical axis indicates a value DF(p); and the traveling direction of light is the positive direction, the focus cam $3a$ has a curve which can be expressed as follows:

$$DF(p) = 1.9478126 \times P + 1.5408115 \times P^2 + 0.98475176 \times$$  (5)

$$P^3 - 1.5403508 \times P^4 + 0.32436475 \times P^5 + 4.8946013 \times P^6 -$$

$$1.0798289 \times P^7 - 4.9395580 \times P^8 + 1.0163760 \times P^9 +$$

$$1.9999253 \times P^{10}$$

Further, the zoom correction cam $1c$ which is disposed at the guide part $1a$ of the stationary member 1 is formed in such a shape that: Assuming that each operating point on the zoom correction cam $1c$ has the wide-angle end position as a datum point; the axis of abscissa as viewed in the drawing indicates the above-stated zoom parameter P; the telephoto end is located in the positive direction; the axis of ordinate obtained with the zoom parameter P from the wide-angle end position toward the optical axis indicates a value DC(p); and the traveling direction of light is the positive direction, the shape of the zoom correction cam $1c$ can be expressed as follows:

$$DC(p) = Z(p) - DF(p) \quad (6)$$

Description of Zooming Action

With the embodiment arranged in the above-stated manner, when the zoom operation ring 9 is rotated for zooming, a force is exerted on the zoom rollers $4b$ provided on the peripheral part of the first lens group carrying tube 4 which engages the inner lead cam groove $9b$ of the zoom operation ring 9. However, as mentioned in the foregoing, the first lens group carrying tube 4 is provided also with the straight moving rollers $4a$. The rollers $4a$ are engaging the vertical slots $1b$ which are formed in the guide part $1a$ of the stationary member 1 and are, at the same time, also engaging the cam slots $2b$ provided in the zoom cam ring 2 which is arranged to rotate in a fixed position. Therefore, when the zoom operation ring 9 is rotated, the first lens group carrying tube 4 moves in the direction of the optical axis and, at the same time, the zoom cam ring 2 comes to rotate.

When the zoom cam ring 2 rotates, the third lens group rollers $6a$ which are arranged on the periphery of the third lens group carrying tube 6 and engage not only the cam slots $2c$ provided in the cam ring 2 for the third lens group but also the vertical slots $1b$ provided in the guide part $1a$ of the stationary member 1 receive a force in the direction of the optical axis. It causes the third lens group carrying tube 6 to move in the same direction.

Further, when the zoom cam ring 2 rotate as mentioned above, the rotating force is exerted on the pins $3b$ which are provided on the focus cam ring 3 and are engaging not only the straight slots $2d$ provided in the cam ring 2 but also the zoom correction cams $1c$ provided in the guide part $1a$ of the stationary member 1. Therefore, when the zoom cam ring 2 rotates, the focus cam ring rotates to the same degree and in the same direction. In the direction of the optical axis, the focus cam ring 3 moves to an extent determined by the shape of the above-stated zoom correction cams $1c$ which are provided in the guide part $1a$. This causes the focus cams $3a$ which are provided in the focus cam ring 3 to move at the same time. Expressing this in respect of the above-stated zoom parameter P, the position of the focus cam $3a$ of the focus cam ring 3 obtained at the position angle P of the zoom cam ring 2 changes from the wide-angle end to the phase angle of P and, at the same time, moves in the direction of the optical axis as much as a value DC(p) from the wide-angle end position.

Description of Focusing Action

In the arrangement described, the operation relative to the focus is performed in the following manner: When the ultrasonic motor 10 rotates to cause the output member 11 to rotate, the focus key 12 which is attached to the output member 11 with a screw rotates. The vertical groove $12a$ which is formed in the fore end part of the focus key 12 then comes to engage the focus pin $5a$ disposed on the periphery of the second lens group carrying tube 5 to cause rotation. Since the focus pin $5a$ engages also the above-stated focus cam $3a$, the focus pin $5a$ moves along the focus cam $3a$ when the ultrasonic motor 10 rotates. This moves the second lens group II carried by the second lens group carrying tube 5 which has the focus pin $5a$. The focus thus can be adjusted.

Detailed Description of Zoom and Focusing Actions

The zooming and focusing actions are described with reference to FIG. 5 as follows: The zooming action is assumed to be performed at the wide-angle end and the focal point of the lens is assumed to be located in the infinite distance position in the initial state. Then, the position of the pin $3b$ of the focus cam ring 3 as shown in FIG. 5 is located at the left end of the zoom correction cam $1c$ provided in the guide part $1a$ of the stationary member 1 and is in a position of $P = 0$ and $DC(o) = 0$. At the same time, focus cam $3a$ which is one of two cams shown in FIG. 5 and is arranged in the focus cam ring 3 in one body with the pin $3b$ is located on the left side. Further, the focus pin $5a$ which is disposed on the second lens group carrying tube 5 is located in its initial position at the wide-angle end of the focus cam $3a$ and is thus in a "wide/$\infty$" position.

Assuming that the focus is shifted from the infinite distance position to the nearest distance position without zooming, the vertical groove $12a$ which is not shown in FIG. 5 but is formed in the fore end part of the focus key 12 moves to the right as viewed in the drawing and moves from an "$\infty$" distance position to a "nearest" distance position shown in FIG. 5. This causes the focus pin $5a$ which is engaging the focus key 12 to rotate to the same degree, so that the movement of DXw in the optical axis direction can be accomplished.

In changing the zooming position in the initial state from the wide-angle end position to the telephoto end position with the focus left on the infinite distance, the embodiment operates as follows: As mentioned in the "Description of Zooming Action" in the foregoing, the pin $3b$ is moved by zooming on the zoom correction cam $1c$ from a "$3b$ (wide)" position to a "$3b$ (tele)" position as shown in FIG. 5. The moving extent obtained by this in terms of phase is from $P = 0$ to $P = 1$.

Further, in the optical axis direction, it changes from DC(0) to DC(1). Therefore, as mentioned in the foregoing, the focus cam 3a moves in the same manner as the pin 3b. Meanwhile, the focus key 12 is fixed and does not move from the infinite distance position "∞" shown in the drawing. Therefore, the focus pin 5a which engages the focus key 12 is allowed to move only in the optical axis direction. The pin 5a thus moves from a "5a (wide/=)" position to a "5a (tele/∞)" position within the range of Zmax. Further, at this time, the focus pin 5a moves relative to the focus cam 3a according to the zoom parameter P as much as DF(p) in the optical axis direction as mentioned in the foregoing. Hence, the focus pin 5a moves to a degree obtained by adding DC(p) which is the movement of the focus cam 3a caused by the zoom correction cam 1c as expressed below:

Moving degree of focus pin 5a=DF(p)+DC(p)   (7)

This, in other words, represents the value Z(p) shown in Formula (6) "DC(p)=Z(p)−DF(p)" which defines the above-stated shape of the zoom correction cam 1c. This thus indicates the movement to be made at the time of zooming in the initial position (∞ state).

Further, in a case where the focus position is to be shifted from the "∞" distance position to the "nearest" distance position at the telephoto end of zooming, the focus pin 5a is moved, as apparent from the foregoing description of operation, from the "5a (tele/∞)" position to the "5a (tele/nearest)" position along the focus cam 3a of "3a (tele)" as shown in FIG. 5. Then, the moving degree in the optical axis direction becomes "$DX_T$".

Generally, with the rotating amount of the focus key 12 assumed to be Q for the coordinates of the focus cam in the unit of zoom parameter P, the position of the focus pin 5a can be expressed by the following formula:

Moving degree of focus pin 5a =DF(p+Q)+DC(p)   (8)

As apparent from Formula (8) above, when the rotating position of the focus key 12 comes from Q =0 to Q =Q according to the zooming parameter P, the moving degree of the focus pin 5a becomes:

=(DF(p+Q) DC(p))−(DF(p)+DC(p))

With this indicated as ΔDF, there obtains the following relation:

ΔADF(p)=DF(p+Q)−DF(p)   (9)

The focus is perfectly corrected when this value becomes equal to a focusing lens drawing-out degree DX(p) which is expressed by Formulas (2) to (4) in the foregoing. The value ΔDF(p) does not include the shape DC(p) of the zoom correction cam 1c at all. Therefore, in determining the shape of the focus cam 3a, the shape can be determined solely on the basis of the focusing lens drawing-out degree DX(p). Besides, it is obtainable irrespectively of the initial position of zooming Z(p).

In the case of this embodiment, the maximum value Qmax of the focus key rotating amount Q is set at "−1" Focus correction errors obtained by using the shape DF(p) of the focus cam 3a are practically sufficiently small, as shown in Table 1 below:

TABLE 1

| | Focus errors at Qmax = −1 (in ref. to P = 1) | | | | | | Q (amount of focusing rotation) |
| --- | --- | --- | --- | --- | --- | --- | --- |
| P: | 0 | 0.2 | 0.4 | 0.6 | 0.8 | 1.0 | |
| Focal length (mm): | 36.3 | 48.0 | 61.8 | 78.7 | 100.2 | 131.7 | |
| Infinite distance: | 0 | 0 | 0 | 0 | 0 | 0 | 0 |
| 6 m: | −0.010 | −0.017 | −0.022 | −0.020 | −0.016 | 0.0 | −0.076 |
| 3 m: | −0.008 | −0.017 | −0.027 | −0.016 | −0.019 | 0.0 | −0.158 |
| 1.5 m: | 0.008 | 0.050 | 0.035 | 0.062 | 0.049 | 0.0 | −0.345 |
| 1 m: | −0.015 | 0.142 | 0.214 | 0.227 | 0.187 | 0.0 | −0.576 |
| 0.7 m: | −0.025 | 0.199 | 0.335 | 0.553 | 0.507 | 0.0 | −1.000 |

Another Embodiment

Figure 6:
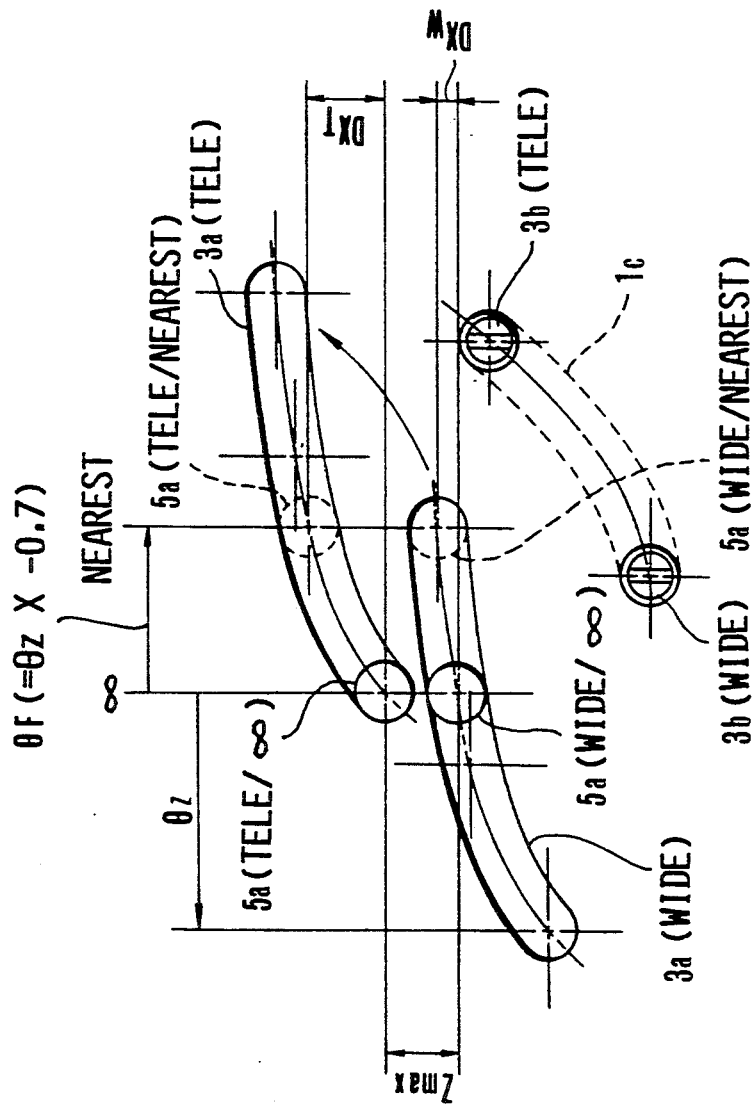
FIG. 6 is a detailed view showing the focusing arrangement of a second embodiment of the invention.

FIG. 6 shows a second embodiment of the invention. FIG. 6 corresponds to FIG. 5 which shows in detail the parts of the first embodiment related to focusing. In the case of the second embodiment, the maximum value Qmax of the rotating amount of the focus key 12 (not shown in FIG. 6) relative to the zoom parameter P is set at Qmax = −0.7 while it is set at Qmax = −1 in the case of the first embodiment. The lens data of the second embodiment is exactly the same as in the case of the first embodiment. Therefore, the zooming movement Z(p) of the second lens group II expressed by Formula (1) and the focusing movement DX(p) of the second lens group II expressed by Formulas (2) to (4) are the same as in the case of the first embodiment. However, with the maximum value of the rotating amount of the focus key set at −0.7, the shape of the focus cam 3a becomes as expressed below:

$$DF(p) = 2.4503517 \times P + 0.72063365 \times P^2 + 2.5641819 \times \quad (10)$$

$$P^3 + 3.3412019 \times P^4 - 10.000348 \times P^5 - 1.6367938 \times$$

$$P^6 + 22.630628 \times P^7 - 8.6568754 \times P^8 - 16.623253 \times P^9 +$$

$$11.236039 \times P^{10}$$

Therefore, the shape of the zoom correction cam 1c which is defined by Formula (6) also becomes different accordingly.

Table 2 shows the focus correction errors of the second embodiment resulting from setting the maximum value Qmax at −0.7:

TABLE 2

| | Focus errors at Qmax = −0.7 (in ref. to P = 1) | | | | | | Q (amount of focusing rotation) |
| --- | --- | --- | --- | --- | --- | --- | --- |
| P: | 0 | 0.2 | 0.4 | 0.6 | 0.8 | 1.0 | |
| Focal length (mm): | 36.3 | 48.0 | 61.8 | 78.7 | 100.2 | 131.7 | |
| Infinite distance: | 0 | 0 | 0 | 0 | 0 | 0 | 0 |
| 6 m: | −0.038 | −0.018 | −0.040 | −0.041 | −0.041 | 0.0 | −0.065 |

TABLE 2-continued

| | Focus errors at Qmax = −0.7 (in ref. to P = 1) | | | | | | |
|---|---|---|---|---|---|---|---|
| P: | 0 | 0.2 | 0.4 | 0.6 | 0.8 | 1.0 | Q (amount of focusing rotation) |
| 3 m: | −0.077 | −0.013 | −0.039 | −0.038 | −0.038 | 0.0 | −0.132 |
| 1.5 m: | −0.160 | 0.020 | 0.070 | 0.073 | 0.071 | 0.0 | −0.276 |
| 1 m: | −0.191 | 0.005 | 0.244 | 0.312 | 0.266 | 0.0 | −0.439 |
| 0.7 m: | −0.176 | 0.045 | 0.290 | 0.659 | 0.645 | 0.0 | −0.700 |

As shown in Table 2 above, the rate of focus errors of the second embodiment is somewhat inferior to that of the first embodiment (Qmax=−1). However, the focus errors remain above a practicable level.

Figure 7:
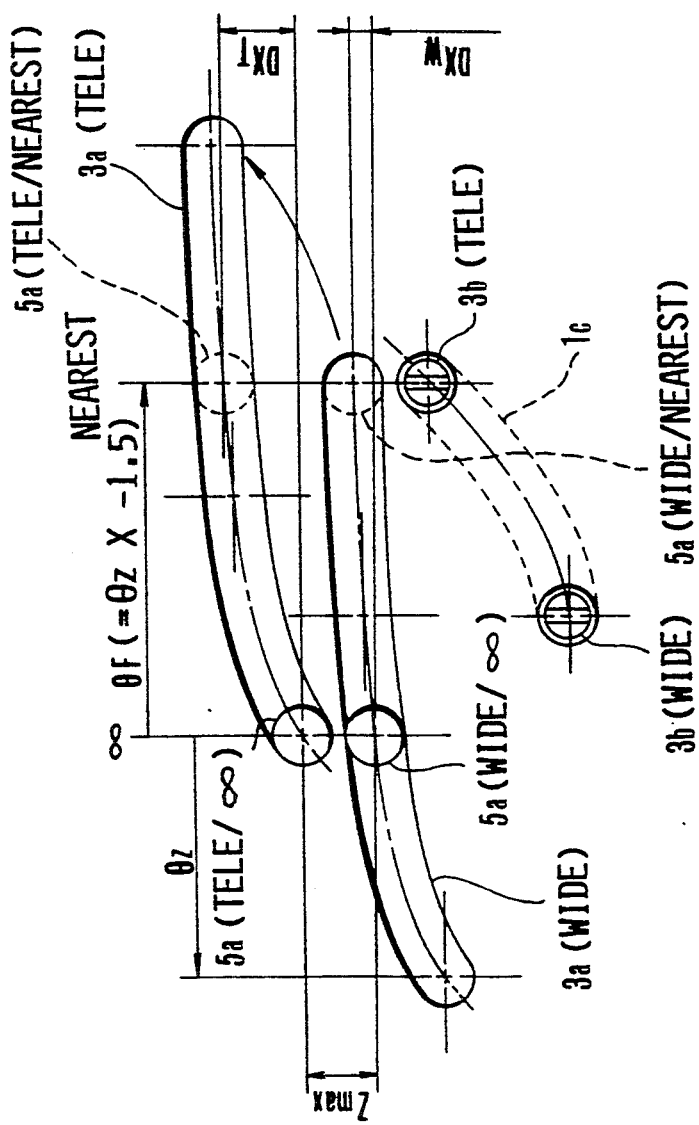
FIG. 7 is a detailed view showing the focusing arrangement of a third embodiment of the invention.

FIG. 7 shows a third embodiment of the invention. FIG. 7 corresponds to FIG. 5 which shows in detail the parts of the first embodiment related to focusing. In the case of the third embodiment, the maximum value Qmax of the rotating amount Q of the focus key 12 (not shown in FIG. 7) in relation to the zoom parameter P is set at −1.5 instead of the value −1 set in the case of the first embodiment. The lens data of the third embodiment is exactly the same as that of the first embodiment. Therefore, the zooming movement Z(p) of the second lens group II expressed by Formula (1) and the focusing movement degree DX(p) of the second lens group II expressed by Formulas (2 to (4) are the same. However, with the value Qmax set at −1.5 as mentioned above, the shape of the focus cam 3a becomes as expressed below:

$$DF(p) = 1.6695979 \times P + 1.0777776 \times P^2 + 1.0203910 \times \quad (11)$$
$$P^3 + 0.57338427 \times P^4 - 0.59106209 \times P^5 - 0.53250041 \times$$
$$P^6 + 0.50648597 \times P^7 + 0.61784332 \times P^8 + 0.16100618 \times P^9 -$$
$$0.00074341 \times P^{10}$$

Therefore, the shape of the zoom correction cam 1c which is defined by Formula (6) also becomes different accordingly.

The focus correction errors of the third embodiment which sets the maximum focus key rotating amount Qmax at −1.5 are as shown in Table 3 below.

TABLE 3

| | Focus errors at Qmax = −1.5 (in ref. to P = 1) | | | | | | |
|---|---|---|---|---|---|---|---|
| P: | 0 | 0.2 | 0.4 | 0.6 | 0.8 | 1.0 | Q (amount of focusing rotation) |
| Focal length (mm): | 36.3 | 48.0 | 61.8 | 78.7 | 100.2 | 131.7 | |
| Infinite distance: | 0 | 0 | 0 | 0 | 0 | 0 | 0 |
| 6 m: | −0.007 | 0.0 | −0.019 | −0.010 | −0.008 | 0.0 | −0.088 |
| 3 m: | −0.0125 | 0.011 | −0.015 | −0.015 | 0.032 | 0.0 | −0.185 |
| 1.5 m: | −0.035 | 0.038 | 0.042 | 0.007 | 0.015 | 0.0 | −0.424 |
| 1 m: | −0.048 | 0.057 | 0.139 | 0.176 | 0.148 | 0.0 | −0.748 |
| 0.7 m: | −0.042 | 0.063 | 0.169 | 0.229 | 0.217 | 0.0 | −1.500 |

As shown in Table 3, the degree of focusing errors is sufficiently small for practical applications.

Figure 8:
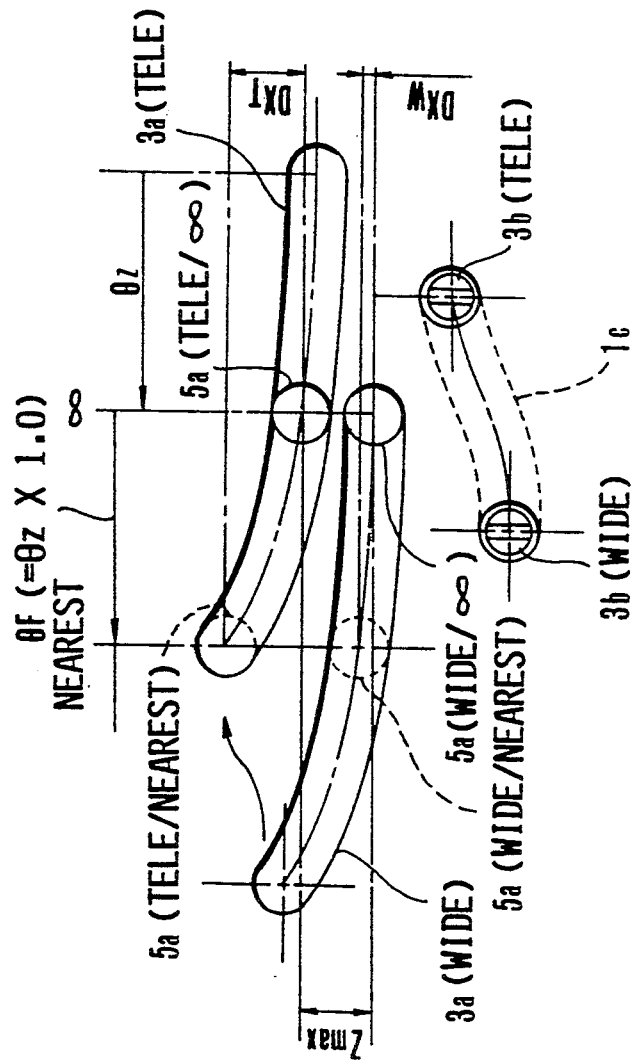
FIG. 8 is a detailed view showing the focusing arrangement of a fourth embodiment of the invention.

FIG. 8 shows a fourth embodiment of the invention. FIG. 8 corresponds to FIG. 5 which shows in detail the parts of the first embodiment related to focusing. In the case of the fourth embodiment, the maximum value Qmax of the rotating amount Q of the focus key 12 (not shown in FIG. 8) in relation to the zoom parameter P is set at +1.0 instead of the maximum value Qmax =-1 set in the case of the first embodiment. The lens data of the fourth embodiment is exactly the same as that of the first embodiment. Therefore, the zooming movement Z(p) of the second lens group II expressed by Formula (1) and the focusing movement degree DX(p) of the second lens group II expressed by Formulas (2) to (4) are the same as in the case of the first embodiment. However, since the maximum value Qmax of the focus key rotating amount Q is set at +1.0, the shape of the focus cam 3a becomes:

$$DF(p) = -0.36173815 \times P - 0.38455492 \times P^2 + \quad (12)$$
$$0.18771790 \times P^3 - 0.45333818 \times P^4 + 0.17652994 \times P^5 -$$
$$0.057486779 \times P^6$$

Therefore, the shape of the zoom correction cam 1c defined by Formula (6) also becomes different.

Figure 9:
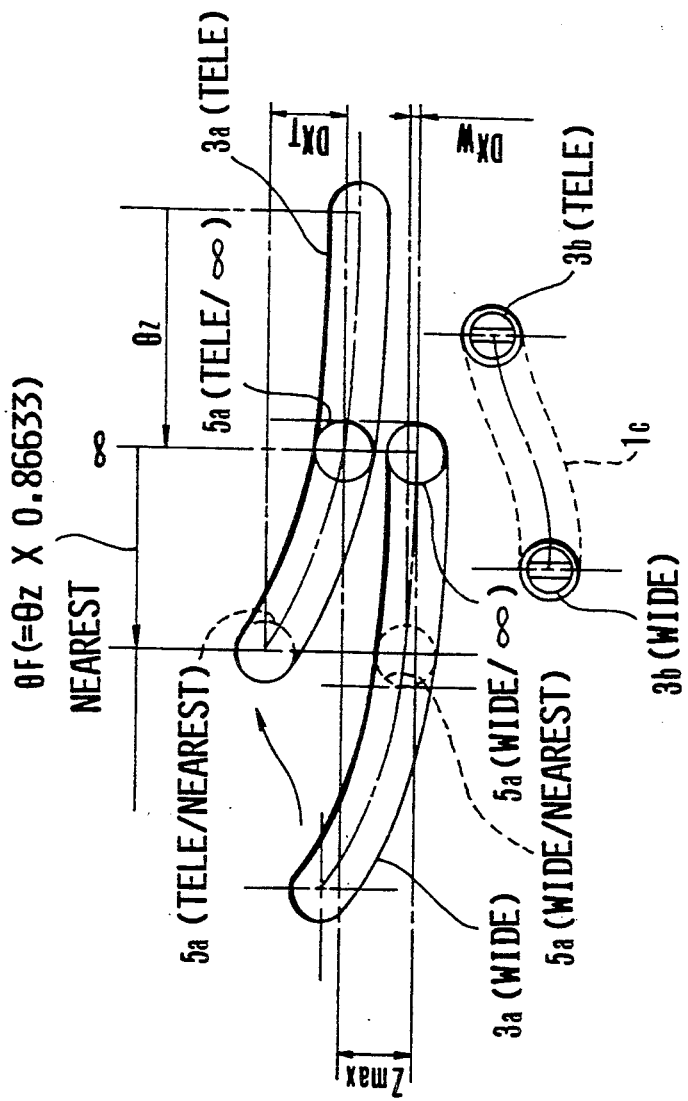
FIG. 9 is a detailed view showing the focusing arrangement of a fifth embodiment of the invention.

FIG. 9 shows a fifth embodiment of this invention. FIG. 9 corresponds to FIG. 5 which shows in detail the parts related to focusing. In the case of the fifth embodiment, the maximum value Qmax of the rotating amount Q of the focus key 12 (not shown in FIG. 9) relative to the zoom parameter P is set at +0.86633 (instead of Qmax = −1 of the first embodiment). The lens data of the fifth embodiment is exactly the same as that of the first embodiment. Therefore, the zooming movement Z(p) of the second lens groups II expressed by Formula (1) and the focusing movement degree DX(p) of the second lens group II expressed by Formulas (2) to (4) are the same as in the case of the first embodiment. However, with the maximum value Qmax set at .0.86633 as mentioned above, the shape of the focus cam 3a becomes as follows:

$$DF(p) = -0.23009284 \times P - 0.51056973 \times P^2 - \quad (13)$$
$$2.8558888 \times P^3 + 11.630518 \times P^4 - 19.298611 \times P^5 +$$
$$17.159134 \times P^6 - 9.1678121 \times P^7 + 2.7320721 \times P^8 -$$
$$0.34074830 \times P^9$$

Therefore, the shape of the zoom correction cam 1c defined by Formula (6) also becomes different.

The features of the first to fifth embodiments described in the foregoing are summarized as follows: In the case of the first, second and third embodiments, the rotation of the focus key 12 relative to the focus cam 3a on the side of the nearest distance is made in the minus direction for the plus direction of the zoom parameter P. In this instance, the rotation angle Qmax at the nearest shooting distance 70 cm can be set as desired in such a way as Qmax = −1, Qmax = −0.7 and Qmax = −1.5.

The fourth and fifth embodiments are arranged to set the maximum value Qmax at a positive value such as Qmax = +1 or Qmax = +0.86633. The value Qmax is also variable in that instance.

In every one of the first to fifth embodiments, the rotating direction and the rotating amount of the focus key 12 are selectable as desired by just varying the mechanical arrangement thereof without varying the optical data.

Figure 10:
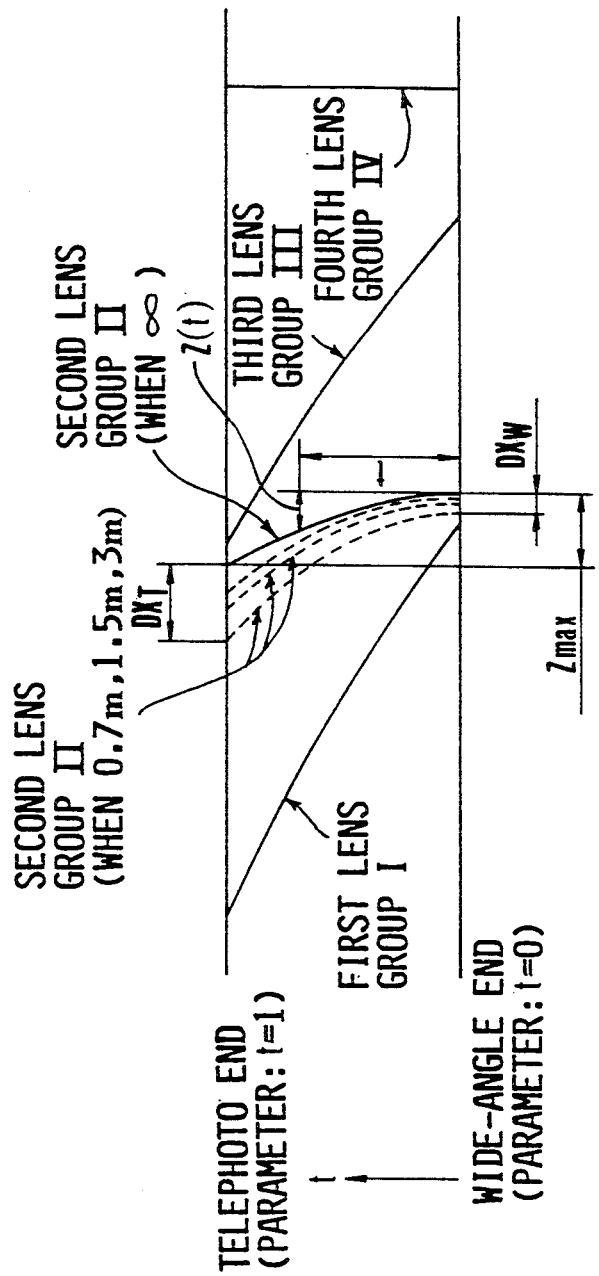
FIG. 10 is a diagram showing the zooming movement of a sixth embodiment of the invention obtained when a zoom parameter is shifted.

Next, a sixth embodiment of the invention is described with reference to FIGS. 10 and 11 as follows:

FIG. 10 approximately corresponds to FIG. 4 which is a diagram showing the zooming movement of each of the first to fifth embodiments. In the case of FIG. 10, the zoom parameter P is used in common only for the telephoto end and wide-angle end. Within an intermediate zooming area, the lens position is shifted without changing the interrelation of the lens groups.

More specifically, in a case where the movements of the lens groups are defined by a common zoom parameter P, the optical efficiency would be unaffected if the parameter P is replaced with another parameter t. This can be expressed as:

$$t = (1-k) P^2 + kP \qquad (14)$$

wherein k represents a constant. In the event of $k = 1$, no shift occurs as there obtains a relation of $P = t$.

A relation which gives $P = 0$ at $t = 0$ and $P = 1$ at $t = 1$ is arranged according to Formula (14) by carrying out a secondary conversion with the constant k set at 1.192. In FIG. 10, a reference symbol "t" denotes the above-stated parameter "t". The positions on the zooming movement curves of the first and third lens groups I and III are somewhat shifted toward the telephoto end in the case of FIG. 10 with the new zoom parameter "t" employed. The zooming movement curve of the second lens group II is also shifted at the same time in accordance with Formula (1) shown in the foregoing. In the drawing, a symbol Z (t) denotes a value obtained with Formula (14) applied to the value Z(p) of Formula (1).

The following shows in approximate expressions which correspond to Formulas (2), (3) and (4) the degrees to which the lens is to be drawn out for focusing:

$$DX_{(t)}^{3m} = -0.2702 - 0.709917071 \times t + 5.33980629 \times \qquad (15)$$
$$t^2 - 32.0498842 \times t^3 + 91.0824983 \times t^4 - 139.473929 \times t^5 +$$
$$108.985803 \times t^6 - 34.6262775 \times t^7$$

In a case where the shooting distance is 1.5 m:

$$DX_{(t)}^{1.5m} = -0.549 - 1.10173155 \times t + 6.01119882 \times t^2 - \qquad (16)$$
$$36.9504768 \times t^3 + 104.286362 \times t^4 - 159.440099 \times t^5 +$$
$$124.382285 \times t^6 - 39.6026394 \times t^7$$

In a case where the shooting distance is 07 m:

$$DX_{(t)}^{0.7m} = -1.2253 - 1.8494839 \times t + 5.95354423 \times t^2 - \qquad (17)$$
$$38.6414717 \times t^3 + 108.360727 \times t^4 - 165.720394 \times t^5 +$$
$$129.142687 \times t^6 - 41.1713092 \times t^7$$

As apparent from the foregoing description, the focusing drawing-out degree $DX_T$ at the telephoto end and the zooming movement degree Zmax of the second lens group II at the infinite shooting distance are the same as those of FIG. 4. Further, the degrees to which the first and third lens groups I and III are to be moved for zooming are also the same as in the case of FIG. 4 while the fourth lens group IV is of course stationary.

Figure 11:
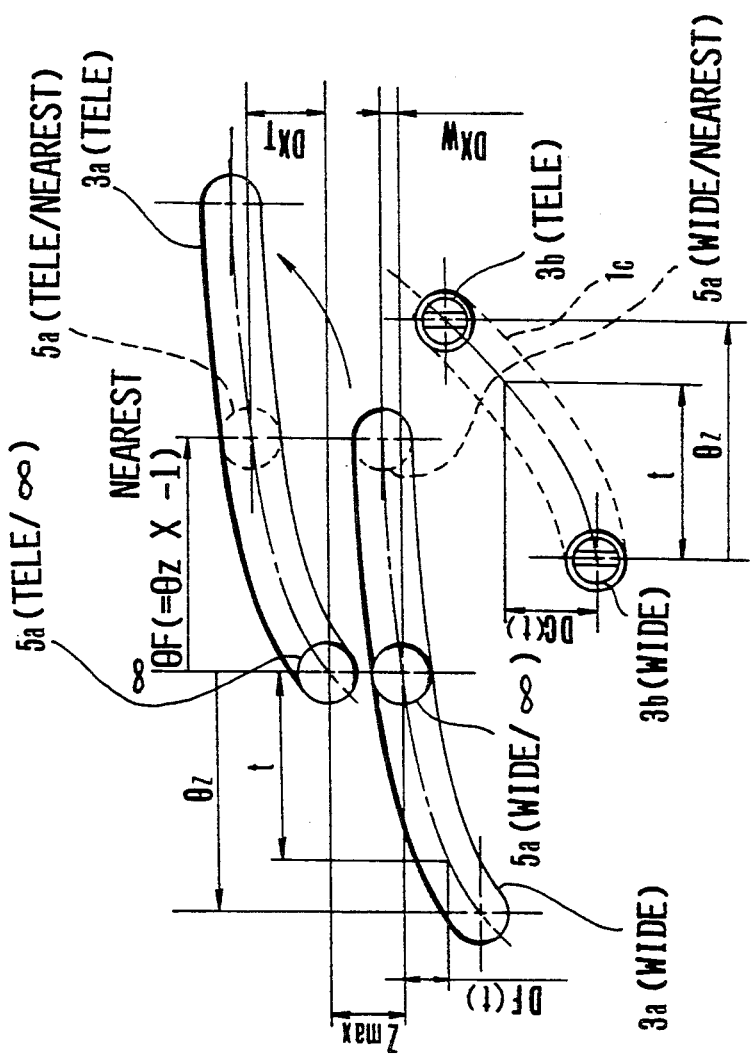
FIG. 11 is a detailed view showing the focusing arrangement of the sixth embodiment as in a state of having the zoom parameter shifted.

FIG. 11 shows in detail the parts related to focusing as in a state obtained at Qmax = −1 with the zoom parameter shifted. The embodiment is about the same as the arrangement shown in FIG. 5 in terms of shape. However, the zoom parameter is changed from "p" to "t" as −mentioned above with reference to FIG. 10.

The shape of the focus cam 3a shown in FIG. 11 becomes, unlike Formula (5), as expressed below:

$$DF(t) = 2.0274326 \times t + 1.1461397 \times t^2 + 0.46308860 \times \qquad (18)$$
$$t^3 + 0.74337313 \times t^4 + 0.84540310 \times t^5 - 1.0077871 \times t^6 -$$
$$0.46128390 \times t^7 + 1.6629125 \times t^8 - 0.27915316 \times t^9 -$$
$$1.1494667 \times t^{10} + 0.59451902 \times t^{11} + 0.56582380 \times t^{12}$$

The focus correction errors obtained by using the focus cam shape DF(t) are shown in Table 4 below:

TABLE 4

Focus errors at Qmax = −1 (in ref. to t = 1), with zoom parameter shifted.

| t | (P) | Focal length (mm) |
|---|---|---|
| 0 | 0 | 36.3 |
| 0.2 | | |
| (0.23072) | (0.2) | 48.0 |
| 0.4 | | |
| (0.44608) | (0.4) | 61.8 |
| 0.6 | | |
| (0.64608) | (0.6) | 78.7 |
| 0.8 | | |
| (0.83072) | (0.8) | 100.2 |
| 1.0 | 1.0 | 131.7 |

| t: | 0 | 0.2 | 0.4 | 0.6 | 0.8 | 1.0 | Q (amount of focusing rotation) |
|---|---|---|---|---|---|---|---|
| Focal length (mm): | 36.3 | 48.0 | 61.8 | 78.7 | 100.2 | 131.7 | |
| Infinite distance: | 0 | 0 | 0 | 0 | 0 | 0 | 0 |
| 6 m: | −0.005 | 0.000 | 0.007 | 0.005 | 0.019 | 0 | −0.070 |
| 3 m: | −0.010 | 0.020 | 0.011 | 0.004 | 0.025 | 0 | −0.148 |
| 1.5 m: | −0.021 | −0.015 | 0.007 | −0.011 | −0.020 | 0 | −0.334 |
| 1 m: | −0.021 | −0.007 | 0.011 | 0.001 | −0.018 | 0 | −0.569 |

TABLE 4-continued

| | | | | | | | |
|---|---|---|---|---|---|---|---|
| 0.7 m: | −0.007 | −0.007 | 0.041 | 0.022 | −0.023 | 0 | −1.00 |

As shown in Table 4, the focus errors shown in Table 1 are saliently improved by just (secondarily) shifting the zoom parameter without varying the interrelation of the lens group.

In accordance with the arrangement of the embodiment described, the rotating amount and the rotating direction of the focusing angle can be set as desired relative to the zooming rotation angle and yet the zoom lens can be compactly designed into a structural arrangement which is not readily affected by the degree of precision of parts and the fitting play of them.

What is claimed is:

1. A zoom lens in which a focusing movement amount of a focusing-and-zooming lens arranged to be moved for both focusing and zooming is varied according to a change of focal length brought about by a zooming action, comprising:
   a) a zooming cam member arranged to rotate around an optical axis in response to zooming;
   b) a zoom cam formed in said zooming cam member;
   c) a first cam follower arranged to engage said zoom cam;
   d) a zooming lens group arranged to be movable in association with the movement of said first cam follower;
   e) a focusing cam member;
   f) a focus cam formed in said focusing cam member;
   g) a second cam follower arranged to engage said focus cam;
   h) said focusing-and-zooming lens arranged to be movable in association with the movement of said second cam follower; i) a focusing rotation member arranged to rotate said second cam follower in response to a focusing action; and j) a moving mechanism arranged to vary the position of said focus cam by rotating and moving said focusing cam member in the direction of an optical axis in response to the rotation of said zooming cam member, in such a manner that a range of engagement of said second cam follower with said focus cam in said focusing action varies and the position of said second cam follower in the optical axis direction varies.

2. A zoom lens according to claim 1, wherein said focusing action is arranged to be performed by using as a drive source the rotation of a motor which is disposed within the zoom lens.

3. A zoom lens according to claim 2, wherein said motor is a vibratory motor.

4. A zoom lens according to claim 1, wherein said focusing action is performed by rotating said focusing rotation member to cause said second cam follower to rotate around the optical axis, and wherein, when said second cam follower is thus rotated, said second cam follower also moves in the direction of the optical axis while sliding over said focus cam.

5. A zoom lens according to claim 4, wherein a key member is employed as said focusing rotation member.

6. A zoom lens according to claim 1, wherein said moving mechanism includes a first cam formed in a stationary member, a second cam formed in said zooming cam member and a third cam follower formed in said focusing cam member, and wherein said third cam follower engages said first and second cams.

7. A zoom lens according to claim 1, wherein said zooming lens group is composed of at least two lens groups, and wherein said focusing-and-zooming lens is disposed behind one lens of said zooming lens group in the optical axis direction.

8. An optical apparatus having a lens optical system in which a focusing movement amount of a focusing-and-zooming lens arranged to be moved for both focusing and zooming is varied according to a change of focal length brought about by a zooming action, comprising:
   a) a zooming cam member arranged to rotate around an optical axis in response to zooming;
   b) a zoom cam formed in said zooming cam member;
   c) a first cam follower arranged to engage said zoom cam;
   d) a zooming lens group arranged to be movable in association with the movement of said first cam follower;
   e) a focusing cam member;
   f) a focus cam formed in said focusing cam member;
   g) a second cam follower arranged to engage said focus cam;
   h) said focusing-and-zooming lens arranged to be movable in association with the movement of said second cam follower;
   i) a focusing rotation member arranged to rotate said second cam follower in response to a focusing action; and
   j) a moving mechanism arranged to vary the position of said focus cam by rotating and moving said focusing cam member in the direction of an optical axis in response to the rotation of said zooming cam member, in such a manner that a range of engagement of said second cam follower with said focus cam in said focusing action varies and the position of said second cam follower in the optical axis direction varies.

9. An optical apparatus according to claim 8, wherein said focusing action is performed by rotating said focusing rotation member to cause said second cam follower to rotate around the optical axis, and wherein, when said second cam follower is thus rotated, said second cam follower also moves in the direction of the optical axis while sliding over said focus cam.

10. An optical apparatus according to claim 9, wherein a key member is employed as said focusing rotation member.

11. An optical apparatus according to claim 8, wherein said moving mechanism includes a first cam formed in stationary member, a second cam formed in said zooming cam member and a third cam follower formed in said focusing cam member, and wherein said third cam follower engages said first and second cams.

12. An optical apparatus according to claim 8, wherein said zooming lens group is composed of at least two lens groups, and wherein said focusing-and-zooming lens is disposed behind one lens of said zooming lens group in the optical axis direction.

13. An optical apparatus according to claim 8, wherein said focusing action is arranged to be performed by using as a drive source the rotation of a motor which is disposed within the zoom lens.

14. A zoom lens in which a focusing-and-zooming lens group arranged to be moved for both focusing and zooming is moved in the direction of an optical axis according to a change of focal length brought about by a zooming action, comprising:
   a) a zooming cam member arranged to rotate around the optical axis in response to zooming;
   b) a zoom cam formed in said zooming cam member;
   c) a first cam follower arranged to engage said zoom cam;
   d) a zooming lens group arranged to be movable in association with the movement of said first cam follower;
   e) a focusing cam member;
   f) a focus cam formed in said focusing cam member;
   g) a second cam follower arranged to engage said focus cam;
   h) said focusing-and-zooming lens arranged to be movable in association with the movement of said second cam follower;
   i) a focusing rotation member arranged to rotate said second cam follower in response to a focusing action; and
   j) a moving mechanism arranged to vary the position of said focus cam by rotating and moving said focusing cam member in the direction of the optical axis in response to the rotation of said zooming cam member, in such a manner that a range of engagement of said second cam follower with said focus cam in said focusing action varies and the position of said second cam follower in the optical axis direction varies.

15. A zoom lens according to claim 14, wherein said focusing action is arranged to be performed by using as a drive source the rotation of a motor which is disposed within the zoom lens.

16. A zoom lens according to claim 15, wherein said motor is a vibratory motor.

17. A zoom lens according to claim 14, wherein said focusing action is performed by rotating said focusing rotation member to cause said second cam follower to rotate around the optical axis, and wherein, when said second cam follower is thus rotated, said second cam follower also moves in the direction of the optical axis while sliding over said focus cam.

18. A zoom lens according to claim 17, wherein a key member is employed as said focusing rotation member.

19. A zoom lens according to claim 14, wherein said moving mechanism includes a first cam formed in a stationary member, a second cam formed in said zooming cam member and a third cam follower formed in said focusing cam member, and wherein said third cam follower engages said first and second cams.

20. A zoom lens according to claim 14, wherein said zooming lens group is composed of at least two lens groups, and wherein said focusing-and-zooming lens is disposed behind one lens of said zooming lens group in the optical axis direction.

21. An optical apparatus having a lens optical system in which a focusing-and-zooming lens arranged to be moved for both focusing and zooming is moved in the direction of an optical axis according to a change of focal length brought about by a zooming action, comprising:
   a) a zooming cam member arranged to rotate around an optical axis in response to zooming;
   b) a zoom cam formed in said zooming cam member;
   c) a first cam follower arranged to engage said zoom cam;
   d) a zooming lens group arranged to be movable in association with the movement of said first cam follower;
   e) a focusing cam member;
   f) a focus cam formed in said focusing cam member;
   g) a second cam follower arranged to engage said focus cam;
   h) said focusing-and-zooming lens arranged to be movable in association with the movement of said second cam follower;
   i) a focusing rotation member arranged to rotate said second cam follower in response to a focusing action; and
   j) a moving mechanism arranged to vary the position of said focus cam by rotating and moving said focusing cam member in the direction of an optical axis in response to the rotation of said zooming cam member, in such a manner that a range of engagement of said second cam follower with said focus cam in said focusing action varies and the position of said second cam follower in the optical axis direction varies.

22. An optical apparatus according to claim 21, wherein said focusing action is performed by rotating said focusing rotation member to cause said second cam follower to rotate around the optical axis, and wherein, when said second cam follower is thus rotated, said second cam follower also moves in the direction of the optical axis while sliding over said focus cam.

23. An optical apparatus according to claim 22, wherein a key member is employed as said focusing rotation member.

24. An optical apparatus according to claim 21, wherein said moving mechanism includes a first cam formed in a stationary member, a second cam formed in said zooming cam member and a third cam follower formed in said focusing cam member, and wherein said third cam follower engages said first and second cams.

25. An optical apparatus according to claim 21, wherein said zooming lens group is composed of at least two lens groups, and wherein said focusing-and-zooming lens is disposed behind one lens of said zooming lens group in the optical axis direction.

26. An optical apparatus according to claim 21, wherein said focusing action is arranged to be performed by using as a drive source the rotation of a motor which is disposed within the zoom lens.

* * * * *

UNITED STATES PATENT AND TRADEMARK OFFICE
CERTIFICATE OF CORRECTION

PATENT NO. : 5,144,490

DATED : September 1, 1992

INVENTOR(S) : Haruhiko Yamanouchi

It is certified that error appears in the above-identified patent and that said Letters Patent is hereby corrected as shown below:

```
Col. 1, line 43.   Change "to serve also as a movement" to
                   -- also serve as a focusing movement. --  and delete
                   -- to be made --
Col. 1, line 44.   Delete "in focusing"
Col. 1, line 63.   Change "has" to -- have --
Col. 2, lines 1, 2.  Delete "and yet they are" and insert
                   -- but which is --
Col. 2, line 61.   After "for" insert -- the first lens group,
                   --
Col. 4, line 5.    Change "with a" to -- where the --
Col. 4, line 66.   Delete ":" and change "Each" to -- each --
Col. 5, line 3.    Before "the" insert -- that --
Col. 5, line 4.    After "tion;" insert -- that --
Col. 5, line 7.    After "and" insert -- that --
Col. 5, line 8.    Change "direction," to -- direction; --
Col. 5, line 19.   Change "Assuming" to -- assuming --
Col. 5, line 21.   After "point;" insert -- that --
Col. 5, line 23.   After "P;" insert -- that --
Col. 5, line 24.   After "direction;" insert -- that --
Col. 5, line 26.   After "and" insert -- that --
Col. 5, line 27.   Change "direction," to -- direction; --
Col. 5, line 53.   After "6a" insert -- , --
Col. 5, line 54.   After "6" insert -- , -- and delete "and"
Col. 5, line 56.   After "group" insert -- , --
```

UNITED STATES PATENT AND TRADEMARK OFFICE
CERTIFICATE OF CORRECTION

PATENT NO.  : 5,144,490
DATED       : September 1, 1992
INVENTOR(S) : Haruhiko Yamanouchi It is certified that error appears in the above-identified patent and that said Letters Patent is hereby corrected as shown below:

| | |
|---|---|
| Col. 5, line 57. | After "member 1" insert -- and -- |
| Col. 5, line 61. | Change "rotate" to -- rotates -- |
| Col. 5, line 62. | After "3b" insert -- , -- |
| Col. 5, line 63. | After "and" insert -- which -- |
| Col. 5, line 65. | After "2" insert -- , -- |
| Col. 5, line 68. | After "ring" insert -- 3 -- |
| Col. 6, line 18. | Change "When" to -- where -- |
| Col. 6, line 19. | After "12" insert -- , -- |
| Col. 6, line 20. | After "screw" insert -- , -- |
| Col. 6, line 25. | Change "engages also" to -- also engages -- |
| Col. 6, line 35. | Change "The" to -- the -- |
| Col. 6, line 43. | After "3a" insert -- , -- |
| Col. 6, line 45. | After "3b" insert -- , -- |
| Col. 6, line 53. | After "5" insert -- , -- |
| Col. 6, line 54. | After "12" insert -- , -- |
| Col. 6, line 63. | Change "As" to -- as -- and after "the" insert -- foregoing -- |
| Col. 6, line 64. | Delete "in the foregoing -- |
| Col. 7, line 9. | Change "(wide/=)" to -- (wide/00) -- |
| Col. 7, line 59. | Change "$\Delta ADF(p)$" to -- $\Delta DF(p)$ -- |
| Col. 8, line 10. | Change "irrespectively" to -- irrespective -- |
| Col. 8, line 56. | Change "Therefore," to -- Accordingly, -- |
| Col. 8, line 58. | Delete "accordingly" |

UNITED STATES PATENT AND TRADEMARK OFFICE
CERTIFICATE OF CORRECTION

PATENT NO. : 5,144,490
DATED : September 1, 1992
INVENTOR(S) : Haruhiko Yamanouchi It is certified that error appears in the above-identified patent and that said Letters Patent is hereby corrected as shown below:

Col. 9, line 38.  Change "Therefore," to -- Accordingly, --
Col. 9, line 40.  Delete "accordingly"
Col. 10, line 64.  Change "In" to -- in --
Col. 11, line 66.  Change "0.020" to -- 0.002 -- in Column under "48.0"

Signed and Sealed this

Eighth Day of February, 1994

BRUCE LEHMAN

Attest:

Attesting Officer

Commissioner of Patents and Trademarks